Figure 1:
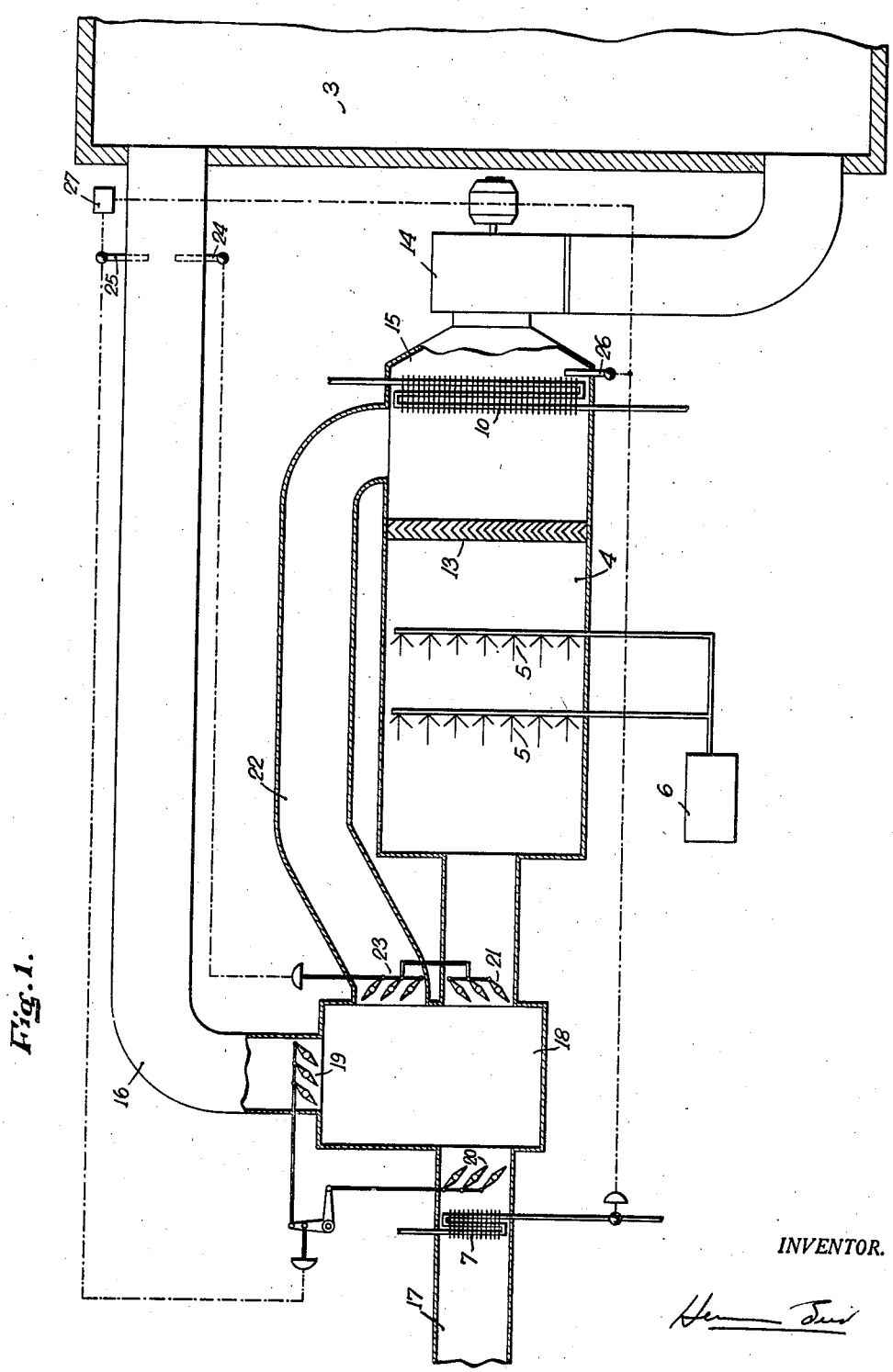

Patented Jan. 24, 1939

2,144,693

UNITED STATES PATENT OFFICE 2,144,693

METHOD AND MEANS FOR CONTROLLING AIR CONDITIONING SYSTEMS

Herman Seid, New York, N. Y., assignor to Carrier Corporation, Newark, N. J., a corporation of Delaware Application November 27, 1934, Serial No. 754,978

8 Claims. (Cl. 236—44)

This invention relates to air conditioning systems for enclosures, more particularly theatres, stores, and rooms where people are accommodated; and to improved methods of introducing outdoor air into an enclosure whereby definite conditions of temperature and relative humidity are produced and maintained in the enclosure, regardless of fluctuations in load within and without the enclosure, and regardless of unforeseen changes in the character of the outdoor air.

The general object of the invention is to provide a system of air conditioning wherein outdoor air either alone or in combination with return air from an enclosure is brought to a desired condition of temperature and moisture content and then mixed with a desired volume of outdoor air or of outdoor air plus air from the enclosure, so that a final mixture is produced of known condition having a temperature higher than that of the conditioned air and a relative humidity lower than that of the conditioned air.

In systems for human comfort, it is highly desirable that as much outdoor air as possible be supplied to the conditioned enclosure in order to promote healthful ventilation. It has, therefore, been recognized that in systems for air conditioning such places as theatres, where thirty cubic feet of air per minute per seat are normally supplied, that at least 25 per cent or thirty per cent of the air should be provided from outdoors, if minimum ventilation requirements are to be met, and the physiological well being of the people provided for. Such outdoor air is sent through a conditioner, either alone or in combination with return air. When it emerges from the conditioner, it is usually, under summer operating conditions, in cold saturated condition. The temperature is known. Its relative humidity, which is substantially one hundred per cent, is also known. In those cases where complete saturation of all the air does not take place, the conditioner is so operated that the temperature and relative humidity of the conditioned air emerging from the conditioner is always known. However, in bypass systems where this conditioned air is then mixed with a volume of return air, in order to form an augmented mixture, sufficient for circulation requirements, and at a temperature more comfortable than that of the conditioned air, it has been considered impractical to utilize outdoor air for bypassing. The reason is that such outdoor air is of unknown quality, whereas the return air is of known quality. The mixture of return air of known quality with conditioned air of known quality results in a final mixture of known quality; whereas, if outdoor air (of unknown quality) were mixed with conditioned air (of known quality), then the final mixture would, obviously, be of unknown quality. Those skilled in the art have, therefore, rejected bypass systems, if outdoor air in any appreciable quantity were routed through the bypass. The only acceptable systems were those in which the bypassed air constituted return air from the enclosure, of known condition.

Applicant's system of air conditioning eliminates the objection to the bypassing of outdoor air for mixture with conditioned air by providing for the control of outdoor air volumes routed through and bypassing a conditioner, whereby the air delivered to the enclosure is always of known quality.

A feature of the invention resides in the provision of a wet bulb thermostat, or similar instrument, operative responsive to conditions in an enclosure, for governing the proportions of return air and outdoor air admitted to a mixing chamber.

Another feature of the invention resides in the provision of a dry bulb thermostat or similar instrument, operative responsive to conditions in the enclosure for governing the proportions of air fed from said mixing chamber in a course through a conditioner, and in a second course bypassing the conditioner.

A further feature of the invention resides in the provision of a fan or other air delivery device for drawing a quantity of air of desired volume from an admission mixing chamber to a delivery mixing chamber through a plurality of conduits, said volume being proportioned as between said conduits responsive to control of resistance means in one or more of the air passages (chambers or conduits). Instead of pulling the air from one chamber to another, it may be pushed. Applicant does not limit himself with respect to the position of the fan in the system.

Another feature provides for maximum use of outdoor air for the purpose of reheating cold conditioned air and forming a mixture with the cold conditioned air which is greater in volume than the cold conditioned air, higher in temperature, and lower in relative humidity.

Another feature provides for conditioning outdoor air alone, or return air alone, or outdoor air plus return air, and mixing the conditioned air with a volume of return air alone, or with a volume of outdoor air alone, or with a volume of outdoor air plus a volume of return air; the character of the air going through the conditioner, and around the conditioner, depending upon the dry bulb and wet bulb conditions within the enclosure served by the system.

A further feature of the invention resides in the control of proportions of outdoor air and return air sent through a conditioner, and routed around a conditioner, responsive to changes in temperature of air delivered to a conditioned enclosure.

Another feature provides for routing outdoor air directly to a conditioner and to a passage bypassing the conditioner; and also, routing return air directly to a conditioner and to a passage bypassing the conditioner, and regulating the quantities of outdoor air admitted to said conditioner and bypass passage responsive to wet bulb temperature conditions in the enclosure served by the system, and regulating the quantities of return air admitted to said conditioner and bypass passage responsive to dry bulb temperature conditions in the enclosure.

Another feature provides for proportioning a volume of outdoor air between a conditioner and passage bypassing the conditioner responsive to outdoor wet bulb temperature conditions, and admitting quantities of return air to said conditioner and bypass passage depending upon the volumes of outdoor air admitted; and controlling volumes of conditioned air and bypassed air delivered to an enclosure responsive to dry bulb conditions in the enclosure.

Another feature provides for governing the quantity of outdoor and/or return air admitted to a conditioner serving an enclosure responsive to difference between wet bulb conditions within the enclosure and outdoors.

A further feature provides for controlling the admission of outdoor air to a conditioner serving an enclosure and to a passage bypassing the conditioner, and for controlling the admission of return air to a conditioner and to a passage bypassing the conditioner responsive to difference in wet bulb conditions within the enclosure and outdoors.

Another feature provides for controlling the admission of outdoor air to a conditioner serving an enclosure and to a passage bypassing the conditioner and for controlling the admission of return air to said conditioner and passage, responsive to dry bulb and wet bulb conditions within the enclosure and outdoors, whereby outdoor air will be admitted to said passage only when the outdoor wet bulb temperature is lower than the wet bulb temperature in the enclosure and the outdoor dry bulb temperature is higher than the dry bulb temperature in the enclosure.

Figure 2:
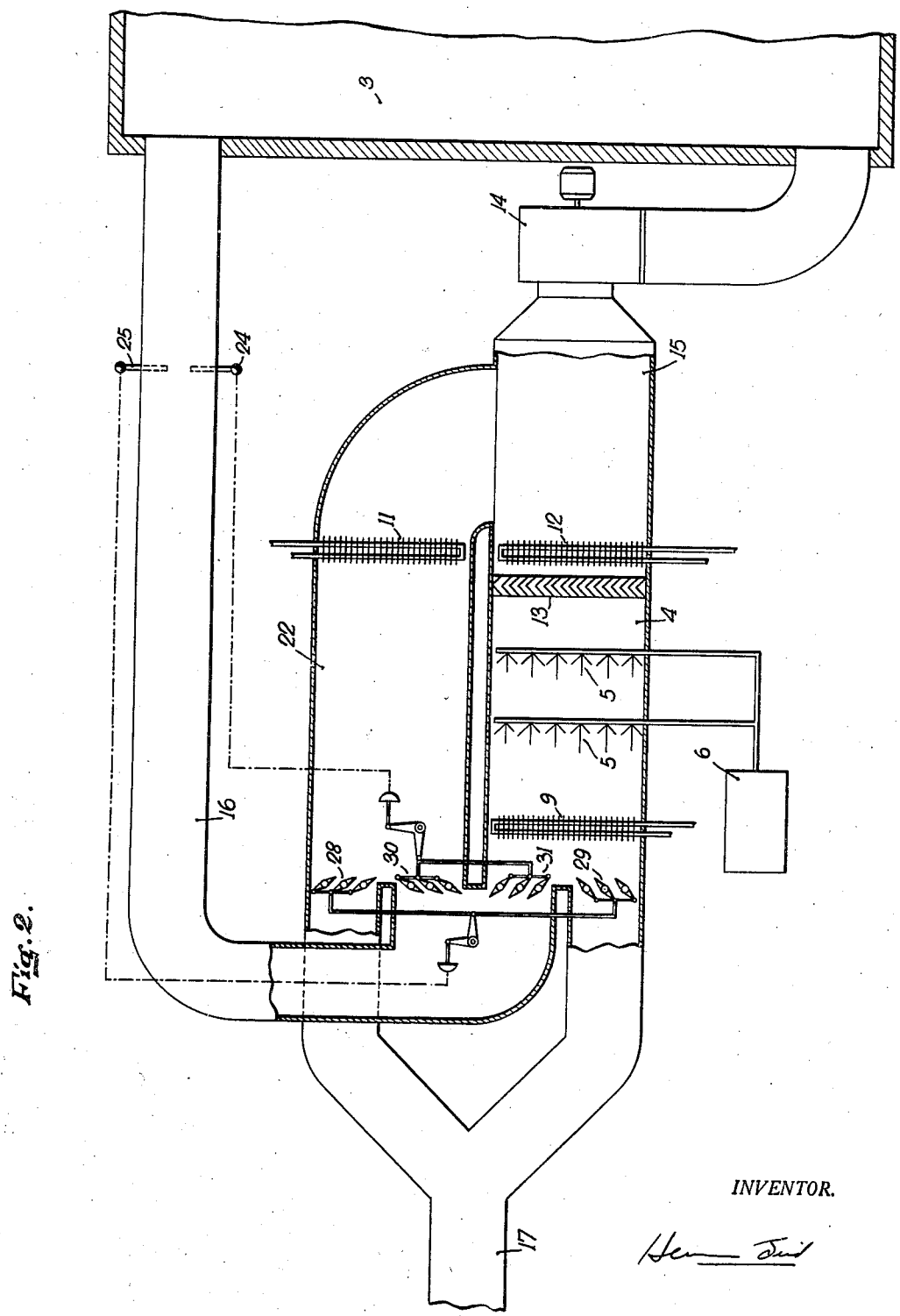
Figure 3:
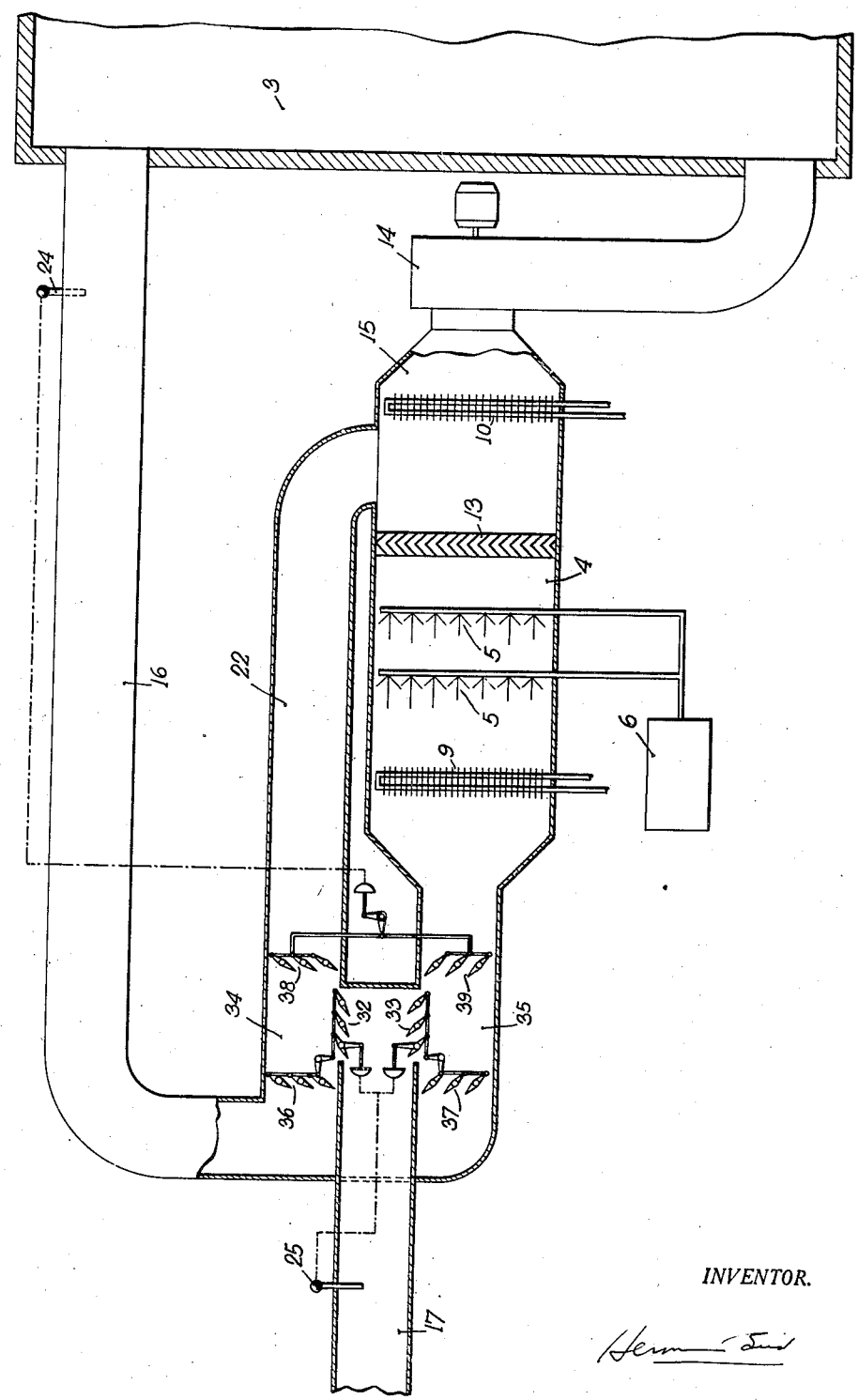
Figure 4:
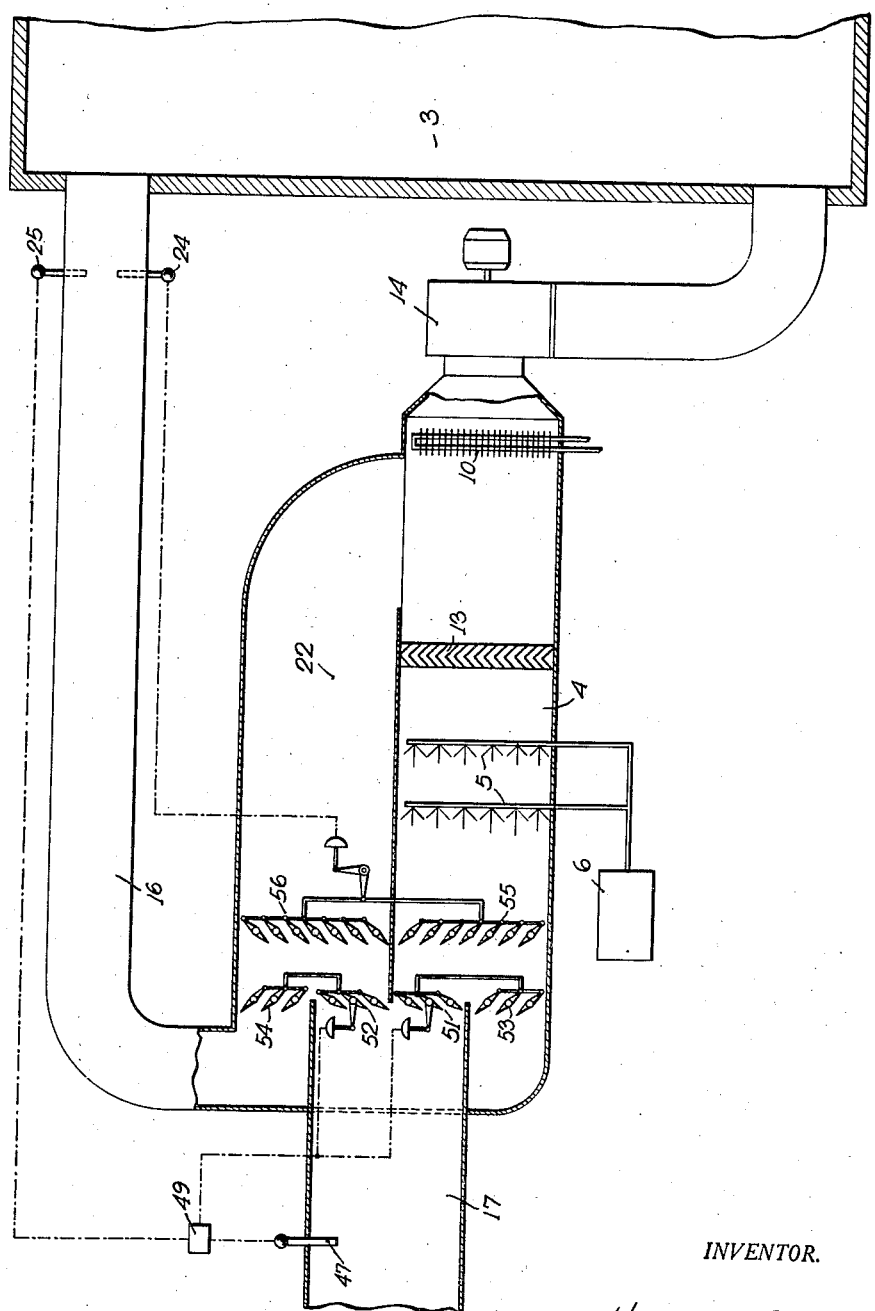
Figure 5:
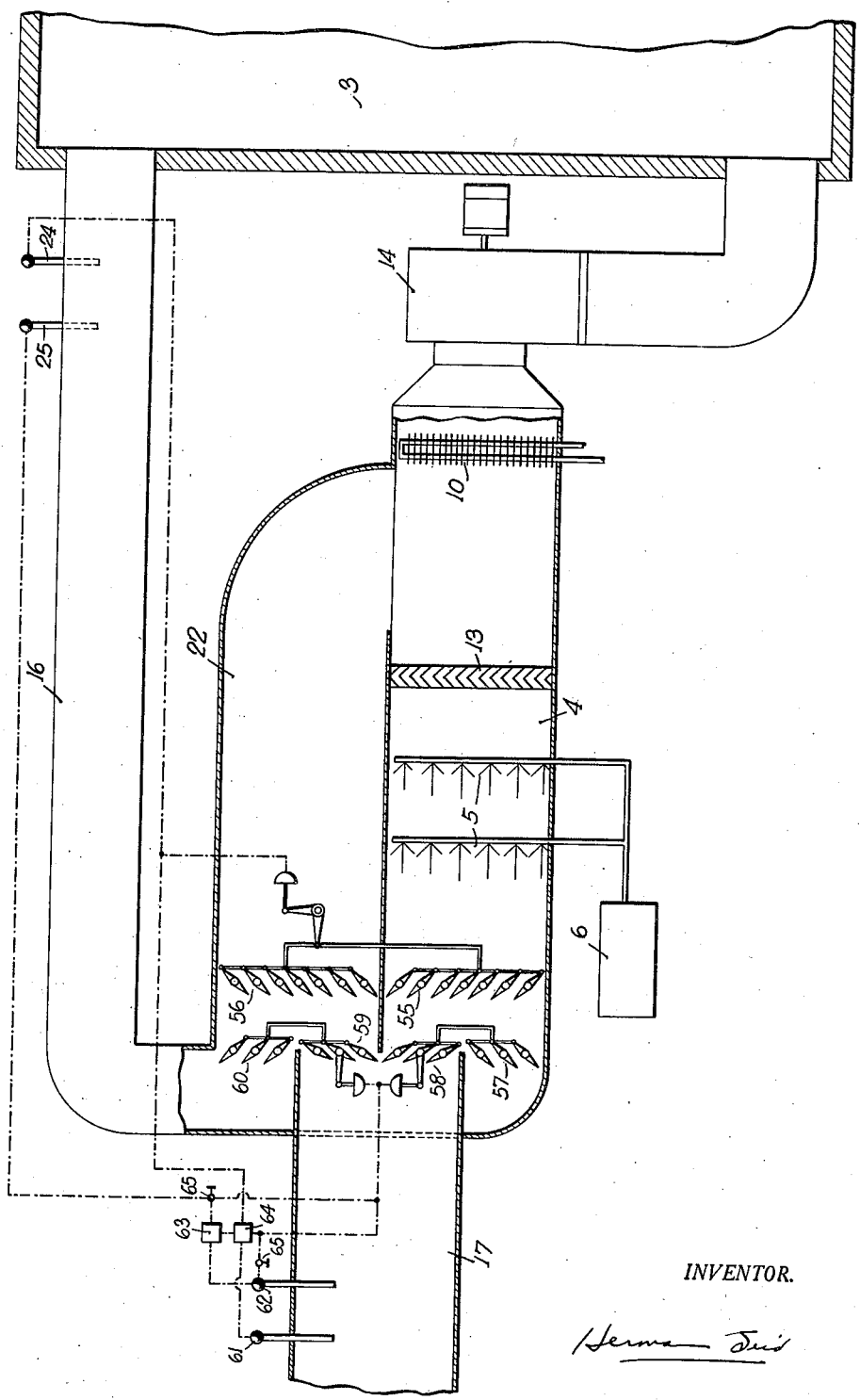

Further features making for efficiency in operation and simplicity in control, and providing maximum advantages flowing from the use of increased quantities of outdoor air will be more apparent from the following description of illustrative forms of applicant's invention to be read in connection with the accompanying drawings, in which:

Fig. 1 is a diagrammatic representation of an air conditioning system wherein a mixture of outdoor air and return air is sent through a conditioner and bypasses a conditioner responsive to dry bulb and wet bulb conditions in the enclosure served by the system;

Fig. 2 similarly shows a system in which outdoor air or return air, or a mixture of the two is sent through a conditioner and mixed with a volume of outdoor air or return air or a combination of the two which bypasses the conditioner;

Fig. 3 is a representation in which control of outdoor and return air volumes through and around a conditioner is carried out responsive to variations in outdoor humidity (wet bulb) conditions;

Fig. 4 illustrates a system wherein the volumes of outdoor air and/or return air supplied to a conditioner serving an enclosure and to a passage bypassing the conditioner are controlled responsive to relation of wet bulb conditions within the enclosure and outdoors; and the relative proportions of a total volume of air passing through said conditioner and passage are controlled responsive to dry bulb conditions in the enclosure; and Fig. 5 illustrates a system wherein volumes of outdoor and/or return air supplied to a conditioner and bypassing a conditioner are controlled responsive to relation of wet bulb conditions within the enclosure and outdoors and responsive to relation of dry bulb conditions within the enclosure and outdoors.

Considering the drawings, similar designations referring to similar parts, numeral 3 represents an enclosure, such as a theatre, auditorium, store interior, dining room, or office space. The air conditioning system serving said enclosure comprises a conditioner 4, equipped with the usual sprays and/or cooling coils 5 served by refrigerating equipment diagrammatically designated by the numeral 6. Preheaters, such as 7 in Fig. 1, and 9 in Fig. 2, and reheaters, such as 10 in Fig. 1, and 11 and 12 in Fig. 2, and eliminators 13, shown in both figures, are of usual design employed in a complete system for summer and winter conditioning, and form no part of the invention herein.

Considering more particularly the arrangement of Fig. 1, fan 14 delivers air from mixing chamber 15 to enclosure 3, and also serves to draw return air from the enclosure through return duct 16 and outdoor air through intake duct 17. The entrance of return air from duct 16 into mixing chamber 18 is under control of return air dampers 19, whereas the admission of outdoor air from intake 17 into mixing chamber 18 is under the control of outdoor air dampers 20. Such return and outdoor air as enters chamber 18 is thoroughly mixed, part of the mixture entering the conditioner under the control of dampers 21, while the remainder bypasses the conditioner through bypass duct 22 under the control of bypass dampers 23. The air which passes through dampers 21 enters conditioner 4, and, under summer operating conditions, is reduced to a desired dewpoint and leaves the conditioner in cold, substantially saturated condition. When it enters mixing chamber 15, it meets a volume of bypassed air entering the mixing chamber through bypass 22. The mixture of conditioned and bypassed air is churned up by the fan and discharged to the enclosure.

Assuming that it is desired to maintain a condition in the enclosure of 75 degrees F. dry bulb temperature and 50 per cent relative humidity, this will give a wet bulb temperature of about 63 degrees F. If the enclosure requires cooling, dry bulb thermostat 24, in return duct 16 will reflect the condition in the house and cause damper 21 to open somewhat wider and cause bypass damper 23 somewhat to close. As a result, more air from mixing chamber 15 will go through the conditioner 4 whereas less will pass through bypass 22. As a result, the mixture discharged by the fan will be of requisite low temperature to compensate for the increased load in the enclosure. If the load in the house continues increasing, the dry bulb thermostat will continue opening damper 21 and closing damper 23 until the point is reached where a sufficient volume of cold air is supplied to the mixture fed to the enclosure by the fan. Thus, while the fan will deliver a constant volume, assuming it is a constant volume fan, the proportions of dehumidified air and bypassed air in the mixture will depend upon the position of dampers 21 and 23 under the control of dry bulb thermostat 26. However, the mixture itself is under control in order that the character of the air fed to the bypass shall not counteract the effective dehumidification in the conditioner. Thus, when outside air conditions are oppressive, as is often the case under summer operating conditions when outside wet bulbs are high, the wet bulb thermostat 25 will act to guard against unsuitable mixtures of outside and return air. Assuming that the air from the enclosure returning through duct 16 reflects a wet bulb higher than say 64 degrees F., it would be a little over one degree higher than the desired wet bulb in the enclosure, then the thermostat would cause return air damper 19 to open wider and outdoor air damper 20 to close somewhat. If the wet bulb condition in the enclosure still remained too high, the opening of 19 and closing of 20 would continue until the wet bulb in the enclosure assumed a desired condition. Under maximum conditions, for which the system is designed, the outside air damper 20 would close completely except for a predetermined minimum always to be admitted for ventilation requirements in order to take care of physiological needs of the people in the enclosure. The rest of the air entering the mixing chamber 18 will be return air through damper 19 which will be substantially wide open. However, if the condition of the outdoor air is such that it may be used without creating undesirable conditions in the house, then a maximum of outdoor air will be intaken through dampers 20 which will then be substantially wide open, and, under such conditions, dampers 19 may be substantially closed. While thermostats 24 and 25 are shown in the return duct, they may be placed in a sampling duct which reflects the condition of the house, so that closing of dampers 19 will not affect the response of the thermostats to actual conditions in the enclosure. Or, they may be placed in a plenum chamber or in the enclosure itself, the only requirement being that the thermostats shall be exposed in such position that they reflect the actual conditions of dry bulb and wet bulb temperatures obtaining in the enclosure. Of course, if the use of outdoor air alone will not result in a proper delivery temperature of the air from mixing chamber 15, then dry bulb thermostat 26 in mixing chamber 15 may exert a master control through a reverse acting relay 27, whereupon return air dampers 19 will open somewhat and outdoor air dampers 20 close somewhat in order to provide some return air containing the heat from the people, to the mixing chamber 18. While this is an added feature, performing no important function under normal summer operating conditions, it may be highly desirable in mild weather, where some refrigeration is required, in order to take care of a substantial inside load due to the congregation of a large number of people.

Ducts 16 and 17 or similar supply passages, are of requisite capacity, so that full requirements of the enclosure may be supplied from either source, if necessary.

The refrigeration equipment for providing a desired dewpoint in the conditioner forms no part of the invention, and any suitable apparatus for producing refrigeration effect and causing dehumidification of air passing through the dehumidifier, is within the purview of the invention. Similarly, any desired dewpoint control may be employed in order to maintain a desired dewpoint in the dehumidifier; or the dewpoint may be arranged to be varied, if desired. The particular apparatus employed forms no part of the invention, any well-known manual or automatic means for regulating the conditioning means and/or the temperature of the conditioning medium in order to control the dewpoint of the air going through the conditioner, being within the purview of the invention.

In Fig. 2, the operation follows the same principle as that disclosed in connection with the operation of the apparatus illustrated in Fig. 1. Outside air may enter bypass passage 22 under the control of damper 28 and may enter the dehumidifier 4 under the control of damper 29. Return air from the enclosure may enter the bypass passage 22 from return air duct or the like 16 under control of return air damper 30. Return air may enter the dehumidifier under the control of damper 31. In operation, dampers 28 and 29 are under the control of wet bulb thermostat 25, whereas dampers 30 and 31 are under the control of dry bulb thermostat 24. The thermostats, as in connection with the system of Fig. 1, need not necessarily be located in return duct 16 but may be placed in a sampling duct or in a plenum chamber or in the enclosure itself, the only requirement being that these instruments respectively reflect the dry bulb and wet bulb conditions in the enclosure. In operation, the position of outdoor air dampers 28 and 29 will be controlled by wet bulb thermostat 25. Thus, when the outdoor wet bulb is favorable and not above a predetermined point, damper 28 will tend to open and damper 29 tend to close. On the other hand, if the outdoor wet bulb were too high, 28 would tend to close and 29 tend to open wider. The object of this control of the outdoor air is to bypass as much outdoor air as possible for reheating of cold conditioned air when the outside air is hot but not at an excessive wet bulb. If, however, the wet bulb is above a desired point, then it will not be desirable to bypass outdoor air, and in this case, the outdoor air damper 28, under control of wet bulb thermostat 25, reflecting an excessive wet bulb temperature in the enclosure, will tend to close, until finally, it is entirely closed, and the outdoor air utilized within the system will all be taken in through damper 29. Under any conditions, a sufficient quantity of outdoor air will be admitted to take care of the physiological requirements of the occupants in the enclosure. This may be done by providing a block which will prevent damper 29 from closing completely.

Dampers 30 and 31 are under control of dry bulb thermostat 24. The air respectively entering the bypass and dehumidifier through these dampers is return air, usually of a character which makes it more economical to be conditioned than outdoor air. When conditions in the enclosure are at a dry bulb above a desired point, thus indicating that more cold air is required, the thermostat will cause damper 31 to open wider and damper 30 to close somewhat. On the other hand, if more reheating of the cold dehumidified air is required, as is the case when the inside dry bulb drops below the desired point, this condition in the enclosure will be reflected by thermostat 24 which will cause damper 31 to close somewhat and damper 30 to open, until the desired temperature is again attained. Dampers 29 and 31 are each capable of admitting a volume of air sufficient to satisfy the dehumidification requirements under extreme load conditions. Each of dampers 28 and 30 have sufficient capacity to admit to bypass 22 as much air as would be required under conditions calling for maximum bypassing. Each may be arranged, however, not to open or close fully, depending upon its differential connection with the related damper.

In Fig. 3, a third arrangement for carrying out applicant's invention is illustrated. In this case, wet bulb thermostat 25 responds to outdoor wet bulb conditions. Outdoor air dampers 32 and 33 control the volumes of outdoor air admitted to mixing chamber or mixing boxes 34 and 35 respectively. Thus, if the outdoor wet bulb temperature is above a certain point, damper 33 will be open, whereas 32 will be in substantially closed position. If the outside wet bulb temperature is below a predetermined maximum, damper 32 will be permitted to open and 33 assume substantially a closed position. Between said maximum and minimum limits, the dampers may be controlled to assume intermediate positions. Damper 32 is differentially connected to damper 36, which admits return air to the mixing box 34, and damper 33 is differentially connected to damper 37 which admits return air to the mixing box 35. As a result, when damper 32 tends to close, damper 36 tends to open, and vice versa. Similarly, as damper 33 moves toward open position, damper 37 will move towards closed position and vice versa. As a result, when more outdoor air is admitted to either of the mixing chambers, less return air will be admitted thereto; and as less outdoor air is admitted to the mixing chambers, more return air will be admitted thereto. Dry bulb thermostat 24 controls dampers 38 and 39. Damper 38 regulates the volume of air admitted from the mixing chamber 34 to bypass passage 22, whereas damper 39 admits air from mixing chamber 35 to dehumidifier or conditioner 4. Dampers 38 and 39 are differentially interconnected, so that as one tends to open, the other tends to close. Thus, when the enclosure calls for a cooler condition, damper 39 will tend to open and damper 38 will tend to close; whereas, if more reheating is required, damper 39 will tend to close and 38 tend to open, in order to permit more air to be bypassed. The fan 14, as in Figs. 1 and 2, delivers the mixture of bypassed and conditioned air to the enclosure. As is the case in Figs. 1 and 2, a large volume of air will always be bypassed, regardless of the proportions of outdoor air and return air passing through the conditioner and passing through the bypass. Under summer operating conditions, whenever dehumidification is required, the dewpoint of the conditioned air will necessarily be so low that an appreciable volume of air will always be bypassed in order that the final mixture may be at a temperature higher than that of the dehumidified air and at a relative humidity appreciably lower than the saturated condition of the dehumidified air. In practice, when the wet bulb temperature of the outside air exceeds a predetermined maximum, the amount admitted to the system will be limited to about 30 per cent of the total volume handled by the fan and substantially all of this air will pass through the dehumidifier. The size of damper 33 can, therefore, be designed to accommodate a desired proportion of the total volume in order that the refrigeration will not be excessive. Damper 32, however, will be so designed that it may handle the entire volume of air required for bypassing, as will damper 36. Damper 37 will be designed to be capable of handling all of the air at any time required for conditioning.

In Fig. 4, wet bulb thermostat 25, operative responsive to changes in indoor wet bulb conditions, and wet bulb thermostat 47, operative responsive to changes in outdoor wet bulb conditions, similarly work together through regulator 49, but in this instance, control the admission of fresh and return air in a bypass system. When the outdoor wet bulb temperature, as recorded by wet bulb thermostat 47, is lower than the indoor wet bulb temperature, regulator 49 will cause damper 51 to open. This will admit outdoor air to conditioner 4. It will also cause damper 52 to open. This will admit outdoor air to the bypass passage 22. Return air damper 53 will close, since it is differentially connected to damper 51 and return air damper 54 will close to a predetermined degree, it being linked to dampers 52. However, when the indoor wet bulb is more favorable, damper 52 will close and damper 51 close except for a predetermined minimum which may be established by a suitable block or stop. Dampers 53 and 54 will then open to admit return air respectively to the conditioner and bypass. The dampers will operate gradually and respond to the varying influence of the wet bulb thermostats 25 and 47 upon regulator 49.

If desired, dry bulb thermostat 24 may control dampers 55 and 56 responsive to sensible heat conditions in the enclosure. As the dry bulb temperature rises, 55 will be opened more widely and 56 correspondingly close, and as dry bulb temperature conditions tend to drop, the reverse action will take place. The other elements in the arrangement of Fig. 4 operate in the usual way as described in connection with the other figures.

In Fig. 5, the system is similar to that of Fig. 4, except that the method of control embraces the use of instruments which respond to dry and wet bulb temperatures inside the enclosure and to dry and wet bulb temperatures in the outer atmosphere. Thus, dry bulb thermostat 24 operates, as in the systems of Figs. 1 and 4, to control dampers 55 and 56. Wet bulb thermostat 25 may control dampers 58 and 59 in like manner as dampers 28 and 29 are controlled by wet bulb thermostat 25 in Fig. 2. In Fig. 5, however, the damper 60 is differentially connected to damper 59 and the damper 57 is differentially connected to 58. Thus, when wet bulb thermostat 25 reflects a falling wet bulb in the enclosure, damper 58 will tend to close and 59 tend to open, thus bypassing as much fresh air as possible. Damper 60, differentially connected to damper 59, will tend to close and 57, connected to 58, tend to open.

Dry bulb thermostat 61 and wet bulb thermostat 62 may be arranged to cooperate through regulators 63 and 64. Thus, wet bulb thermostat 62 may cooperate with wet bulb thermostat 25 through regulator 63. In that event, the dampers 58 will tend to open when the outdoor wet bulb is more favorable than the indoor wet bulb and will tend to close when the outdoor wet bulb is less favorable than the indoor wet bulb. 59 will tend to close when 58 tends to open, and vice versa. Dampers 57 and 60 will work in opposition to 58 and 59 respectively. In addition, a dry bulb thermostat 61 may be employed responsive to changes in outdoor dry bulb temperature. In that event, dry bulb thermostat 61, in cooperation with dry bulb thermostat 24, through regulator 64, would be linked with regulator 63, which operates responsive to the action of wet bulb thermostats 25 and 62. As a result, after the pet cocks are suitably set so that the four thermostats may accurately control the pressure to the damper motors serving dampers 58 and 59, damper 58 will tend to close and 59 tend to open if the outside wet bulb is lower than the inside wet bulb and the outside dry bulb is higher than the inside dry bulb. Thus, outside air will go through the conditioner when the outside dry bulb is lower than the inside dry bulb and it will also go through the conditioner when the outside wet bulb is higher than the inside wet bulb. This control is, therefore, advantageous in those cases where high outside dry bulb and low outside wet bulb conditions are encountered. It will be seen, therefore, that by manipulating the various pet cocks 65, it will be possible to control the outside and return air volumes passing through and bypassing the conditioner responsive to inside wet bulb, inside dry bulb, outside dry bulb and outside wet bulb conditions, and every possible combination of these factors.

Applicant, therefore, provides a maximum volume of outdoor air to his systems at all times and assures the bypassing of a maximum volume of outdoor air whenever conditions make such operation feasible; and yet always assures the production and maintenance of comfortable conditions at a proper dry bulb temperature and relative humidity within the enclosure, at a minimum cost for refrigeration needed for dehumidification.

The dimensions of passages shown in the figures is not an indication of the relative sizes to be used in actual practice. The dimensions will vary in accordance with the engineering requirements of each particular job; and no limitation is made as to size, shape, or arrangement of the various parts.

No limitation is made with respect to the manner of producing refrigerating effect or of controlling the dewpoint of air passing through the dehumidifier.

While the systems shown, for example, in Figs. 1, 2 and 3 are preferably controlled automatically, applicant does not limit himself to full automatic operation. Obviously, an operator may note wet and dry bulb conditions in an enclosure and manually control, through manually operable pressure controls or otherwise, the various dampers, in accordance with the disclosure herein. Thus, similar results will be attained and desired dry bulb and wet bulb conditions produced and maintained in the enclosure by substantially the same method of control, even though the precise instrumentalities are manually or semi-automatically operable rather than fully automatically operable.

Since certain changes in carrying out the above methods and in the constructions set forth, which embody the invention may be made without departing from its scope, it is intended that all matter contained in the above description or shown in the accompanying drawings shall be interpreted as illustrative and not in a limiting sense.

I claim:

1. A method of conditioning an enclosure, consisting in apportioning a volume of outdoor air so that some of it will go through a conditioner and the remainder bypass the conditioner, apportioning a volume of return air from the enclosure so that some of it will go through a conditioner and the remainder bypass the conditioner, controlling the proportions of outdoor air and return air going through the conditioner and bypassing the conditioner responsive to a differential in wet bulb temperatures in the enclosure and outside the enclosure, and delivering all said volumes of air to the enclosure.

2. A method of conditioning an enclosure, consisting in delivering outdoor air to a conditioner, delivering outdoor air to a passage bypassing the conditioner, causing outdoor air to go through the conditioner and through the passage bypassing the conditioner when the wet bulb temperature outdoors is lower than the wet bulb temperature indoors, controlling the entrance of return air to the conditioner and to the passage bypassing the conditioner, dehumidifying the outdoor air and return air which passes through the conditioner, mixing the dehumidified air with the air going through the bypass passage and delivering the mixture to the enclosure.

3. A method of conditioning an enclosure, consisting in sending outdoor air through a conditioner, sending outdoor air through a passage bypassing the conditioner, sending return air through the conditioner, sending return air through the passage bypassing the conditioner, and proportioning the volumes of return air and outdoor air passing through the conditioner and through the passage bypassing the conditioner responsive to changes in web bulb conditions inside the enclosure and outside the enclosure, and responsive to changes in dry bulb conditions inside the enclosure and outside the enclosure, and delivering to the enclosure the air passing through the conditioner and through the bypass passage, in constant volume.

4. In an apparatus of the character described for conditioning an enclosure under summer operating conditions, means for withdrawing air from said enclosure, means for at all times withdrawing air from the outdoor atmosphere, means including a mixing chamber for mixing said withdrawn airs, means for controlling the proportions of said different airs in said mixture in accordance with changes in the moisture content of said air withdrawn from said enclosure, in such manner that the proportion of outdoor air in said mixture is reduced to a point not less than a predetermined minimum as the moisture content of said air withdrawn from the enclosure increases and vice-versa, a conditioner casing containing dehumidifying means affecting all portions of air passed therethrough, means for conducting a portion of said mixture to said casing, means including a bypass passage bypassing said casing for constantly conducting another portion of said mixture for reuniting with said first portion subsequent to treatment of said first portion, means for varying the proportions of air in said first and second portions in accordance with changes in the dry bulb temperature of air withdrawn from said enclosure, and means for delivering the air of said first and second portions subsequent to their mixture to said enclosure.

5. In an apparatus of the character described for conditioning an enclosure under summer operating conditions, a conditioner casing containing dehumidifying means affecting all portions of air passed therethrough, a bypass passage bypassing said casing for uniting with air delivered from said conditioner casing bypassed air from said passage, means for conducting air withdrawn from said enclosure to said bypass passage and to said casing, means for at all times withdrawing air from the outdoor atmosphere and for conducting said air to said bypass passage and to said casing, means responsive to changes in the moisture content of one of said withdrawn airs for controlling the proportions of outdoor and return air supplied to said passage and for controlling the proportions of outdoor and return air supplied to said casing, means responsive to changes in the dry bulb temperature of said air withdrawn from said enclosure for controlling the proportions of air passing through said bypass passage and said casing respectively, blower means for effecting the withdrawal of said air from said enclosure and said air from the outdoor atmosphere and for moving air through said bypass passage and said casing, and means for conducting to said enclosure intermingled air from said bypass passage and from said conditioner casing.

6. A method of conditioning an enclosure, consisting in apportioning a volume of outdoor air so that some of it will go through a conditioner and the remainder bypass the conditioner, apportioning a volume of return air from the enclosure so that some of it will go through a conditioner and the remainder bypass the conditioner, controlling the proportions of outdoor air and return air going through the conditioner and bypassing the conditioner responsive to the differential between a characteristic of air in the enclosure and the corresponding characteristic of air outside the enclosure, and delivering all of said volumes of air to the enclosure.

7. A method of conditioning an enclosure, consisting in delivering outdoor air to a conditioner, causing outdoor air to go through the conditioner and to be bypassed around the conditioner when the wet bulb temperature outdoors is lower than the wet bulb temperature indoors and the dry bulb temperature outdoors is higher than the dry bulb temperature indoors, delivering variably controlled volumes of return air to the conditioner and bypassing variably controlled volumes of return air around the conditioner, dehumidifying the outdoor air and return air which passes through the conditioner, mixing the dehumidified air with the air bypassed around the conditioner, and delivering the mixture to the enclosure.

8. In an apparatus of the character described for conditioning an enclosure under summer operating conditions, a conditioner casing containing dehumidifying means affecting all portions of the air passed therethrough, bypass means bypassing said casing for uniting bypassed air with air delivered from said conditioner casing, means for conducting air withdrawn from said enclosure to said bypass means and to said casing, means for at all times withdrawing air from the outdoor atmosphere and for conducting said air to said bypass means and to said casing, means responsive to changes in a characteristic of one of said withdrawn airs for controlling the proportions of outdoor air and return air supplied to said bypass means and for controlling the proportions of outdoor air and return air supplied to said casing, means responsive to changes in another characteristic of the air withdrawn from said enclosure for controlling the proportions of air supplied to said bypass means and said casing respectively, blower means for effecting the withdrawal of said air from said enclosure and said air from the outdoor atmosphere and for moving air through said bypass means and said casing, and means for conducting to said enclosure intermingled air from said bypass means and from said casing.

HERMAN SEID.